United States Patent [19]
Lane

[11] Patent Number: 6,155,623
[45] Date of Patent: Dec. 5, 2000

[54] CANTILEVERED TRAILOR

[76] Inventor: James B. Lane, 13341 Hexam Rd., Brooksville, Fla. 34613

[21] Appl. No.: 09/304,331

[22] Filed: May 3, 1999

[51] Int. Cl.[7] ....................................................... B60P 3/00
[52] U.S. Cl. ....................... 296/26.09; 224/405; 224/501; 224/521
[58] Field of Search .............................. 296/26.08, 26.09; 224/405, 485, 501, 510, 523, 545, 547, 548, 518, 519, 521

[56] References Cited

U.S. PATENT DOCUMENTS

| | | | |
|---|---|---|---|
| 5,845,831 | 6/2000 | Nusbaum et al. | 224/505 |
| 5,884,930 | 3/1999 | Cluth | 224/521 X |
| 6,070,926 | 6/2000 | Hardin | 296/26.08 |

*Primary Examiner*—Dennis H. Pedder
*Attorney, Agent, or Firm*—Stanley M. Miller

[57] ABSTRACT

A trailer apparatus having no wheels is releasably connected to a trailer hitch at the rear of a motorized vehicle in cantilevered relation to the vehicle. The apparatus includes a longitudinally disposed base and a cradle disposed in transverse relation to the base. The base includes a pair of support posts for the cradle so that the cradle may be selectively positioned near the leading end of the base for relatively short loads and near the trailing end of the base for relatively long loads. The cradle is disconnected from the base and positioned in parallel relation to it when the apparatus is in storage. The apparatus weighs about fifty pounds and has carrying handles. It can be assembled and attached to a trailer hitch by one person in about two minutes.

9 Claims, 3 Drawing Sheets

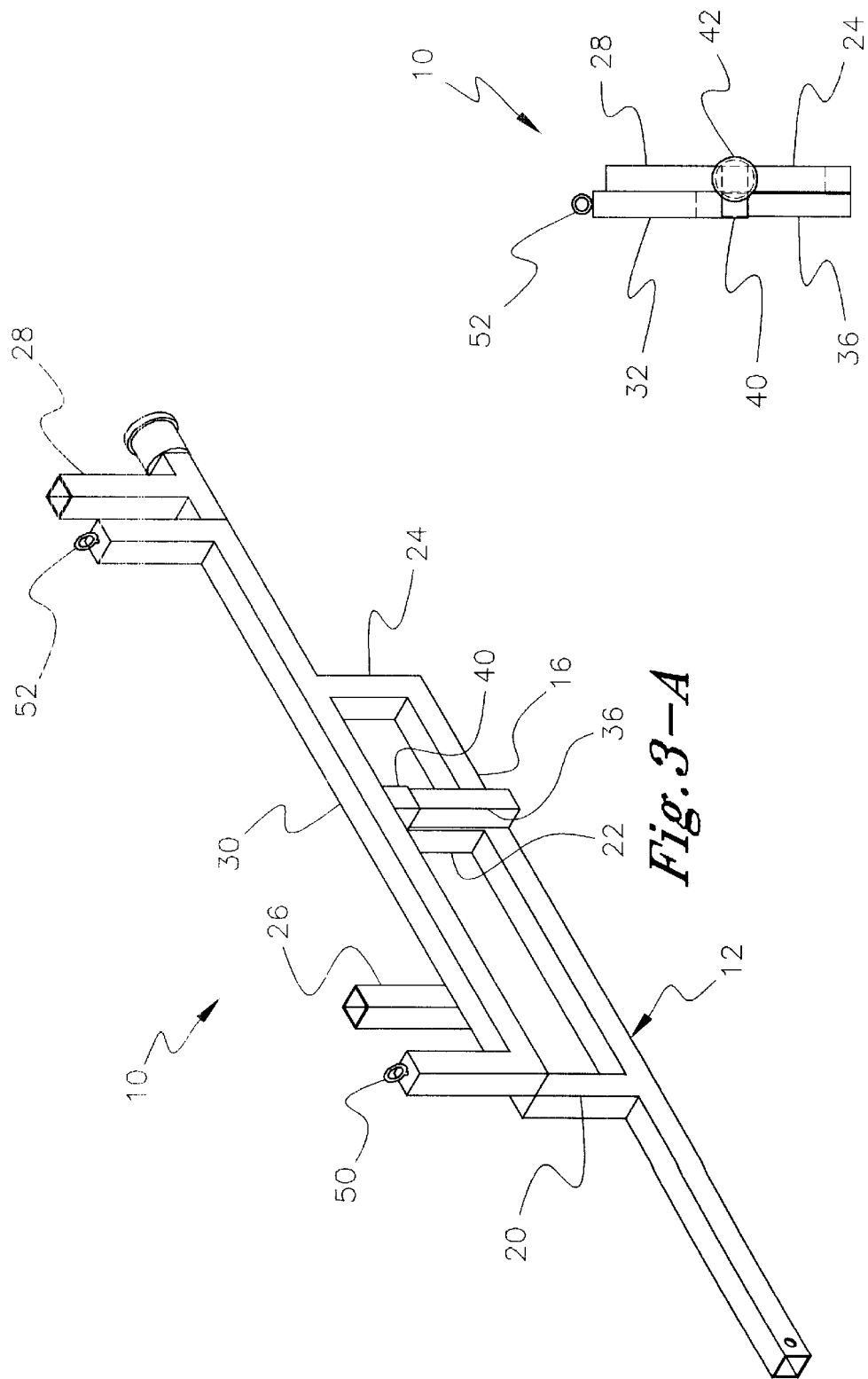

1

CANTILEVERED TRAILOR

BACKGROUND OF THE INVENTION

1. Field of the Invention

This invention relates, generally, to trailers of the type hauled by motorized vehicles. More particularly, it relates to a trailer that extends from a trailer hitch in cantilevered relation thereto.

2. Description of the Prior Art

Hauling lumber or other long objects in the range of sixteen to eighteen feet or thereabout is usually accomplished by using a sixteen or eighteen foot trailer. A trailer hitch is mounted to the rear of a vehicle, and the trailer is hitched thereto. There are many disadvantages to these commonly-used trailers. First of all, they cost between $600.00 to $800.00. Since they include tires, weigh between six hundred to a thousand pounds and are towed over highways, a tag and a spare tire must be purchased. Some states even require trailer owners to buy insurance coverage for them. Moreover, the regular tires wear out and require replacement every two or three years. The entire trailer requires preventive maintenance every four or five years. The trailers have wooden flooring, which also must be placed every couple of years. The hitches also wear out and require replacement. The user can forget to lock the hitch down, and the safety chains can come loose and drag on the roadway.

The trailers are also difficult to drive with. It is hard to find a parking space, and most people find it hard to back a trailer into a space. The driver also has to make wide turns. Since the trailers can "fishtail" at high speeds, most states limit their highway speed to about forty five miles per hour. Even more disadvantages could be recited. The point is that an alternative apparatus is needed for hauling long objects over the public roads.

However, it was not obvious to those of ordinary skill in this art how the needed apparatus could be provided, in view of the art considered as a whole at the time the present invention was made.

SUMMARY OF THE INVENTION

The long-standing but heretofore unfulfilled need for an innovation that overcomes the limitations of the prior art is now met by a new, useful, and nonobvious invention. The present invention is an apparatus for hauling long loads over roads. It includes a base member that is longitudinally disposed. The base member has a bottom rail and a top rail that are disposed in parallel relation to one another. A spacer means interconnects the bottom rail and the top rail in said parallel relation to one another.

A first hollow support post and a second hollow support post are mounted near a leading end and a trailing end, respectively, of the top rail member.

A cradle member is transversely disposed with respect to the base member. The cradle member has an upstanding cradle post at each of its opposite ends. The cradle member further has a depending post at its midpoint, and the depending post is adapted to be slidingly received within a preselected one of the first and second support posts.

A leading end of the bottom rail is adapted to be releasably secured to a trailer hitch so that the apparatus is adapted to be disposed in cantilevered relation to a towing vehicle.

A storage sleeve is secured to a preselected side of a preselected one of the spacer means that interconnects the bottom rail and the top rail. The storage sleeve slidably receives the depending post of the cradle means when the apparatus is in a storage configuration. The cradle means is disposed in parallel relation to the base member when the apparatus is in the storage configuration.

A pair of handle members are secured to the top rail to facilitate carrying of the base member and an eye hook is mounted to a top end of each of the upstanding cradle posts.

A bracket is mounted to a trailing end of the top rail and a taillight is mounted to the bracket. The taillight is adapted to be in electrical communication with brake lights of the vehicle.

A trailing end of the top rail is disposed in cantilevered relation to a trailing end of the bottom rail.

A first spacer means is positioned at a leading end of the top rail, a second spacer means is positioned at a trailing end of the bottom rail, and a third spacer means is positioned therebetween. These spacer means interconnect the top rail and the bottom rail to one another in parallel relation to one another. The top and bottom rails also lie in a common vertical plane.

The first support post is disposed near a leading end of the top rail at a preselected location intermediate respective positions of the first spacer means and the third spacer means, and the second support post is positioned near a trailing end of the top rail.

It is a primary object of this invention to provide an apparatus for hauling long objects over public roads in the absence of a conventional trailer.

Another object is to provide a wheel-less, cantilevered trailer that is free from the disadvantages of conventional trailers.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 3-A is a perspective view of the novel apparatus when in its stored configuration.

FIG. 3-B is an end elevational view of the novel apparatus when in its stored configuration.

DETAILED DESCRIPTION OF THE PREFERRED EMBODIMENT

Figure 1:
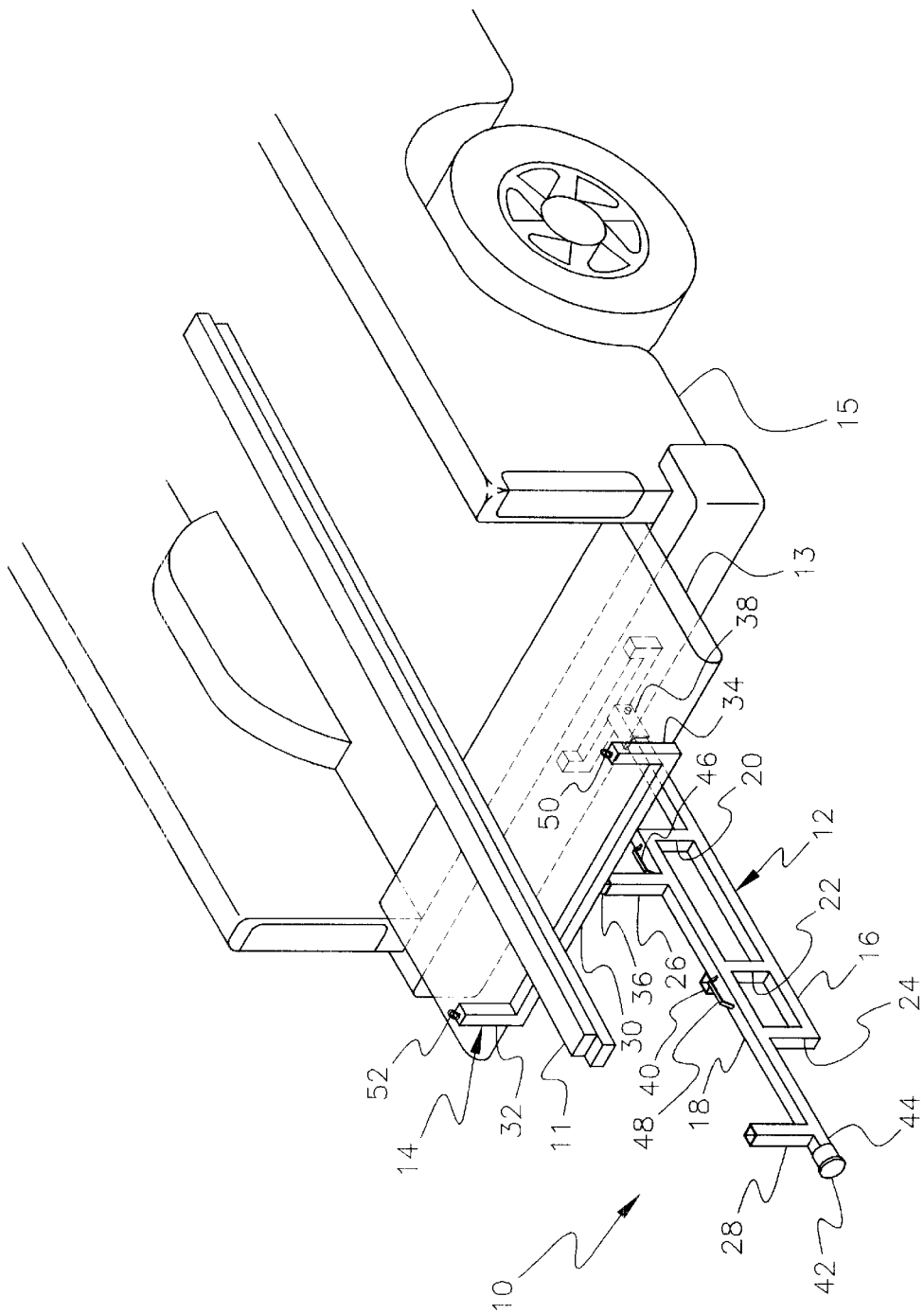
FIG. 1 is a perspective view of the novel apparatus when in use and configured in a first configuration.

Referring now to FIG. 1, it will there be seen that an exemplary embodiment of the invention is denoted as a whole by the reference numeral 10.

Cantilevered trailer 10 has two primary parts: a longitudinally disposed base 12 and a transversely disposed cradle 14, both of which are preferably of hollow, square tubular construction. Other types of construction are within the scope of this invention.

Base 12 includes bottom rail 16, top rail 18, upstanding spacer arms 20, 22, 24, and upstanding support posts 26, 28.

First spacer arm 20 is positioned at a leading end of top rail 18, second spacer arm 24 is positioned at a trailing end of bottom rail 16, and third spacer arm 22 is positioned therebetween.

The trailing end of top rail 18 is disposed in cantilevered relation to the trailing end of bottom rail 16.

Cradle 14 includes horizontally disposed cradle rail 30, upstanding cradle posts 32, 34 at the opposite ends of rail 30, and a central post 36 that depends from the mid-point of said rail 30.

It should be observed that bottom rail 16 and top rail 18 are parallel to one another and positioned in a common vertical plane. The leading end of bottom rail 16 is releasably connected to a trailer hitch 38 in a conventional way, but no hitch coupler is needed. In this way, the entire novel apparatus is disposed in cantilevered relation to the rear of the vehicle to which it is attached.

Figure 2:
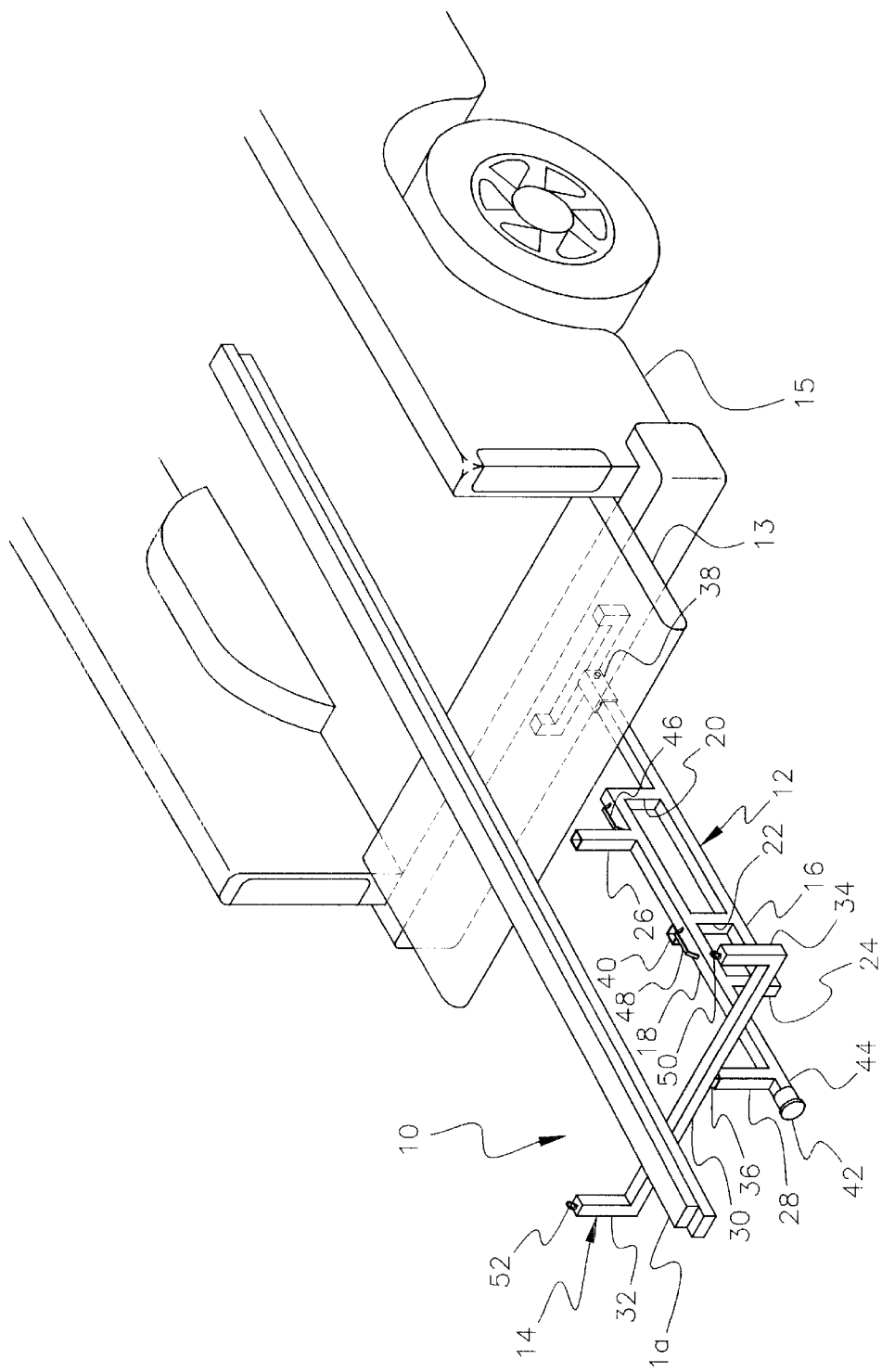
FIG. 2 is a perspective view of the novel apparatus when in use and configured in a second configuration.

When the novel apparatus is configured to carry a relatively short load such as board 11, as depicted in FIG. 1, depending central post 36 is slidably received within leading support post 26. Note that tailgate 13 of truck 15 is down. When the novel apparatus is configured to carry a long load in the range of sixteen to eighteen feet, such as board 1a for example, as depicted in FIG. 2, depending central post 36 is slidably received within trailing support post 28.

A storage sleeve 40 is secured to a preselected side of spacer arm 22. To store novel apparatus 10, depending central post 36 of cradle 14 is slidably received within said storage sleeve as indicated in FIG. 3-A and FIG. 3-B.

A taillight 42 is mounted to bracket 44 at the trailing end of top rail 18, and said taillight is in electrical communication with the brake lights of the vehicle.

A pair of handles 46, 48 are mounted to top rail 18 to facilitate carrying of base 12, and eye hook means 50, 52 are mounted to the top of cradle end posts 32, 34. They can be used in tying down a load or for other purposes.

There are numerous advantages that the novel cantilevered trailer has over conventional trailers. First of all, it has no wheels and weighs but fifty pounds or so. Thus, there are no regular tires, spare wheels, tags, or insurance to buy. One person can install it without help in just two minutes. It can travel over roads at highway speeds, does not "fishtail," does not require wide turns, does not produce "trailer whip," will not jack-knife on slippery highways, and includes no wooden floors which require painting or replacing. It is also easy to back into a parking space. Lacking wheels, it has no wheel bearings to repack or replace.

Not only does the novel apparatus have utility in carrying lumber up to eighteen feet in length, it can also carry boats, canoes, motorcycles and the like. It can carry any weight up to the capability of the vehicle's suspension system.

The only maintenance required is re-painting if desired and the replacement of the taillight if it burns out. There is no hitch coupler to replace.

The space required to store the novel apparatus when not in use is also nominal when compared with the space required to store a sixteen to eighteen foot conventional trailer.

This invention represents a major breakthrough in the art of trailers. Being drawn to a pioneering invention, the claims that follow are entitled, as a matter of law, to broad interpretation to protect the heart or essence of the invention from piracy.

It will thus be seen that the objects set forth above, and those made apparent from the foregoing description, are efficiently attained. Since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. An apparatus for hauling long loads over roads, comprising:

a base member that is longitudinally disposed;

said base member having a bottom rail and a top rail that are disposed in parallel relation to one another;

a spacer means for interconnecting said bottom rail and said top rail in said parallel relation to one another;

a first hollow support post and a second hollow support post mounted at a leading end and a trailing end, respectively, of said top rail member;

a cradle member that is transversely disposed with respect to said base member;

said cradle member having an upstanding cradle post at each of its opposite ends;

said cradle member having a depending post at its midpoint, said depending post adapted to be slidingly received within a preselected one of said first and second support posts; and a leading end of said bottom rail being for securement to a trailer hitch so that said apparatus is adapted to be disposed in cantilevered relation to a towing vehicle.

2. The apparatus of claim 1, further comprising a storage sleeve secured to a preselected side of a preselected one of said spacer means that interconnects said bottom rail and said top rail, said storage sleeve slidably receiving said depending post of said cradle means when said apparatus is in a storage configuration, said cradle means being disposed in parallel relation to said base member when said apparatus is in said storage configuration.

3. The apparatus of claim 1, further comprising a pair of handle members secured to said top rail to facilitate carrying of said base member.

4. The apparatus of claim 1, further comprising an eye hook mounted to a top end of each of said upstanding cradle posts.

5. The apparatus of claim 1, further comprising a bracket mounted to a trailing end of said top rail and a taillight mounted to said bracket, said taillight for electrical communication with brake lights of said vehicle.

6. The apparatus of claim 1, wherein a trailing end of said top rail is disposed in cantilevered relation to a trailing end of said bottom rail.

7. The apparatus of claim 1, wherein a first of said spacer means is positioned at a leading end of said top rail, wherein a second of said spacer means is positioned at a trailing end of said bottom rail, and wherein a third of said spacer means is positioned therebetween.

8. The apparatus of claim 7, wherein said first support post is disposed near a leading end of said top rail at a preselected location intermediate respective positions of said first spacer means and said third spacer means.

9. The apparatus of claim 8, wherein said second support post is positioned near a trailing end of said top rail.

* * * * *